Aug. 2, 1938.  R. J. WISE  2,125,704
AUTOMATIC DUPLEX BALANCE CORRECTOR
Filed Sept. 11, 1935  3 Sheets-Sheet 1

Inventor
R. J. Wise

Eugene C. Brown
Attorney

Aug. 2, 1938.   R. J. WISE   2,125,704
AUTOMATIC DUPLEX BALANCE CORRECTOR
Filed Sept. 11, 1935   3 Sheets-Sheet 2

Inventor
R. J. Wise

Eugene C. Brown
Attorney

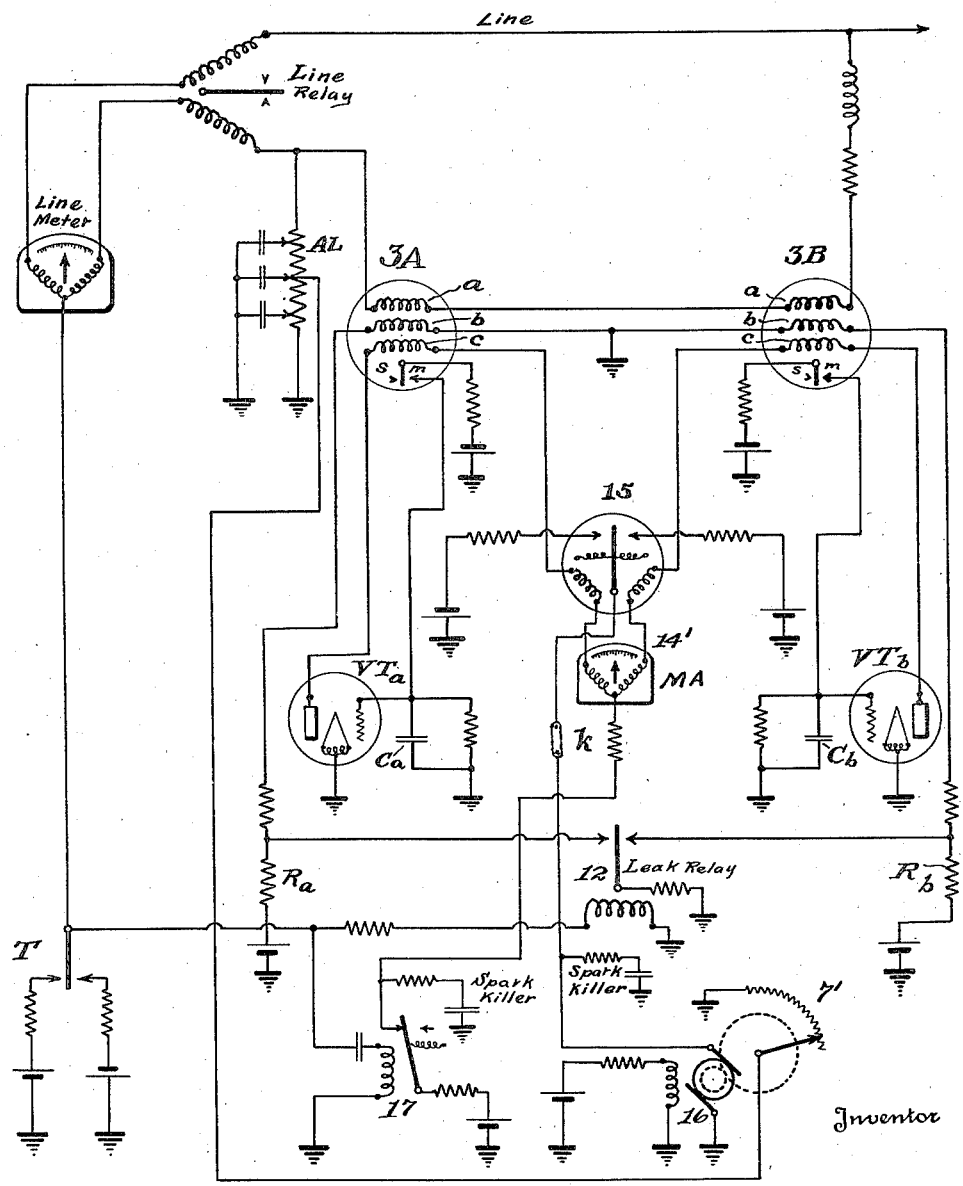

Patented Aug. 2, 1938

2,125,704

UNITED STATES PATENT OFFICE 2,125,704

AUTOMATIC DUPLEX BALANCE CORRECTOR

Raleigh J. Wise, Dunellen, N. J., assignor to The Western Union Telegraph Company, New York, N. Y., a corporation of New York Application September 11, 1935, Serial No. 40,169

5 Claims. (Cl. 178—60)

This invention relates to duplex telegraph systems and particularly to the balancing of the real line and the artificial lines of such systems.

In duplex systems, as is well known, the artificial line must closely balance the real line for proper operation of the system. The electrical charactristics of the real line vary over a wide range due to changes in weather and atmospheric conditions and it is necessary to adjust the artificial line, from time to time, to maintain the correct balance. It is the usual practice to balance the line each day, ordinarily early in the morning when the traffic is light. However, at this time the atmosphere is frequently damp and the transmission characteristics of the line may be quite different from that existing later in the day.

One of the principal objects of my invention is to provide an organization of apparatus for indicating any lack of balance between the real and artificial lines and the character of such unbalance. Another object of my invention is to provide means for automatically correcting any unbalance and thereby maintain a substantially uniform state of balance during periods of transmission.

I have found that any unbalance between the real and artificial lines of a bridge or differential connected receiving device in a duplex system affects the wave form of the received signals. If the artificial line contains excessive resistance, the received signal will have a minimum steady state amplitude when the outgoing and incoming signals are of the same polarity, while the received signal will have a maximum amplitude when the outgoing and incoming signals are opposite in polarity. Likewise when the artificial line contains insufficient resistance, the converse is true, so that during the co-existence of like polarities in outgoing and incoming signals, the maximum amplitude occurs and during the co-existence of unlike polarities, the minimum steady state amplitude occurs.

I make use of this characteristic variation in the amplitude of received signals in the duplex balancing methods disclosed herein. In one arrangement, I measure the maximum amplitude of the received signal and determine whether the incoming and outgoing polarities are like or unlike at each instant the received signals attain their maximum amplitude. If the maximum amplitude consistently occurs while the polarities are alike, it indicates that the artificial line resistance should be increased, while if the maximum amplitude consistently occurs when the polarities are unlike, it indicates that the resistance of the artificial line should be decreased. If the duplex is properly balanced the maximum amplitude will occur indiscriminately of polarity combinations.

I have referred above to the use of both polarities of the incoming signals. However, it is necessary to make use of only one of the polarities of the received signal. For example, the variations in the amplitude of the received "marking" signals taken with respect to the polarity of the coincident outgoing signals gives an accurate measure of the duplex unbalance.

The invention will be more fully understood from the following description in connection with the accompanying drawings, in which—

Figures 4 and 5 show other arrangements for automatically adjusting the resistance of the artificial line to correct unbalance.

Figures 1, 2:
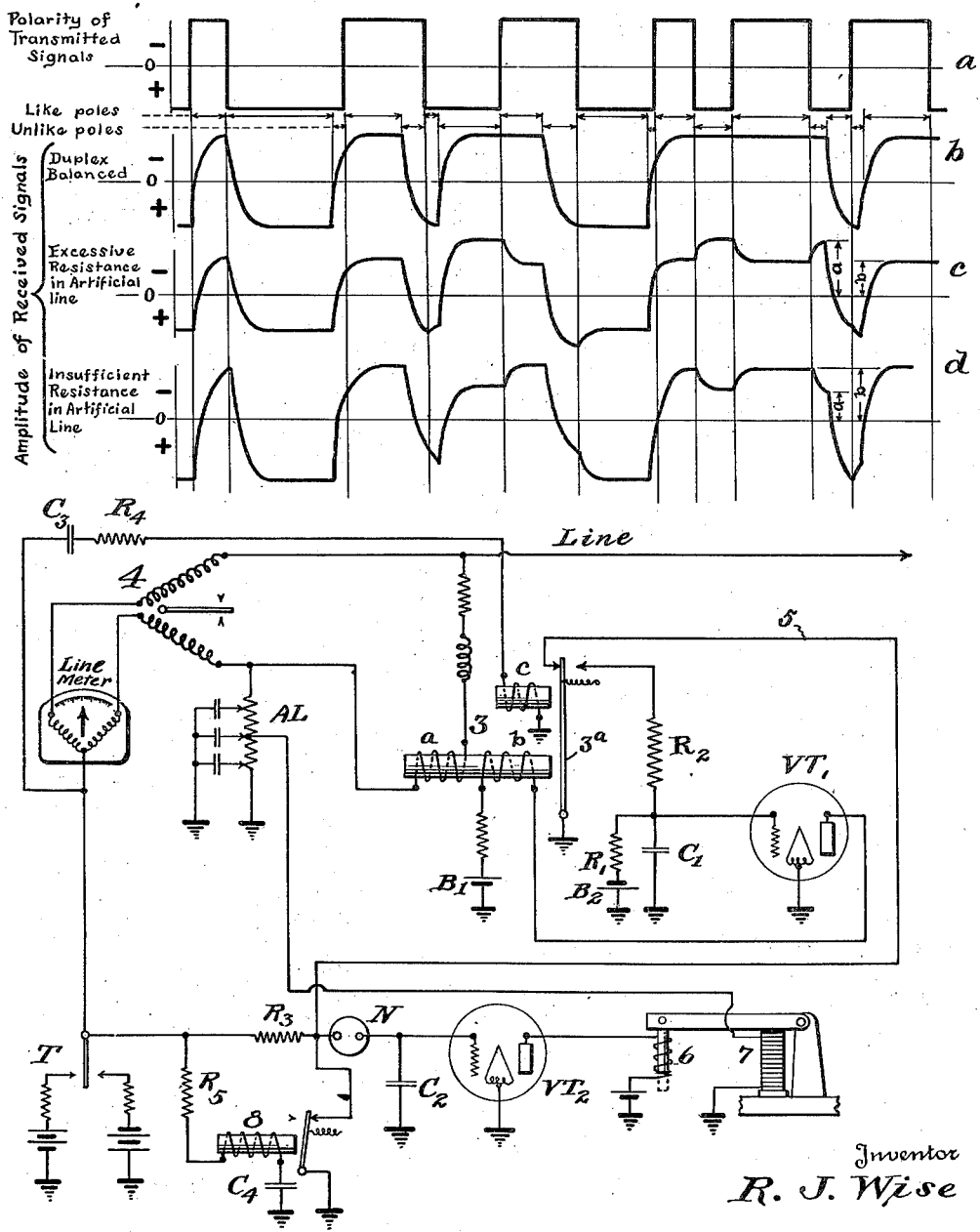
Figure 1 illustrates the wave form of the signals under different conditions.
Figure 2 is a diagrammatic illustration of an arrangement of apparatus for automatically balancing the real and artificial lines at one terminal of a duplex system in accordance with my invention.

The underlying principle upon which my several arrangements for indicating or correcting unbalance in duplex telegraph systems is based is illustrated in Figure 1. Curve $1^a$ shows graphically the polarities of the signal waves as they are transmitted into the apex of the duplex system. Curve $1^b$ shows the wave form of the signals received from the distant terminal when the artificial line at the receiving terminal is properly balanced. The wave form is therefore not affected by the transmitted signals which appear simultaneously with the received signals in the phase relation shown graphically. Curve $1^c$ shows the manner in which the received signals are modified by the transmitted signals of curve $1^a$ when the artificial line contains excessive resistance. Curve $1^d$ shows the received signal waves as they are modified by the transmitted signals of curve $1^a$ when the artificial line contains insufficient resistance.

Upon referring to curve $1^c$, showing the effect upon the wave form when the artificial line contains excessive resistance, it will be observed that during the interval of time when the outgoing and incoming signals are of the same polarity, the received signals have a minimum steady state amplitude, and while the outgoing and incoming signals are opposite in polarity, the received signals have a maximum amplitude.

The converse is true in curve 1$^d$, when the artificial line contains insufficient resistance, that is, during the coexistence of like polarities in the outgoing and incoming signals, the maximum amplitude occurs; and during the coexistence of unlike polarities, the minimum steady state amplitude occurs.

Applying this principle of characteristic variation in the amplitude of received signals to my duplex balancing arrangements, if maximum amplitude consistently occurs while the polarities are alike, it indicates that the artificial resistance should be increased, whereas if the maximum amplitude consistently occurs when the polarities are unlike, it indicates that the artificial line resistance should be increased. Obviously, if the duplex is properly balanced, the maximum amplitude will occur indiscriminately of polarity combinations.

In Fig. 2 I have illustrated an arrangement for determining the peak voltage of one of the polarities of the received signals, which gives an accurate measure of the duplex unbalance, and applying this peak voltage to automatically adjust the resistance unbalance in the artificial line. One winding $a$ of a "breakover relay" (or amplitude measuring relay) 3, is shown bridged across the main receiving relay 4. A second winding $b$ receives local current from battery B$_1$ through the plate circuit of a vacuum tube VT$_1$. One polarity of the incoming line signal will weaken the force of the relay set up by the second coil $b$ and unless the plate current energizing this coil is sufficiently large, the received polarity from the line will reduce the magnetic pull of the relay to such an amount that the armature 3$^a$ will be drawn against its backstop by the spring. The other polarity of the received signal causes an increase in the pull of the relay to maintain the armature against its front stop. The condenser C$_1$ receives a negative charge from the battery B$_2$ at a very slow rate through resistance R$_1$. This negative charge applied to the grid of tube VT$_1$ causes a very gradual weakening of the current through coil $b$ of the relay 3 and this action allows the peak value of the received signals in coil $a$ to release the armature at intervals.

When the armature 3$^a$ engages the backstop or contact, the condenser C$_1$ discharges at a rate determined by the resistance R$_2$ and thereby causes an increase in the current through the coil $b$. Hence, it will be seen that the relay 3 automatically maintains an adjustment which allows the relay to be operated only by the peak values of the received signals. With the proper rate of condenser charge and discharge, there is very little change in the value of plate current while the duplex system is in operation if the line does not change in resistance.

It will be evident that the "breakover relay 3" is the means of detecting maximum signal amplitude. Each time the contact of the armature with its front stop is broken, by a received signal of maximum amplitude, a ground is removed from a lead 5 from the transmitter T and this allows the potential being transmitted at that instant to become effective across the grid condenser C$_2$. If, for example, negative potential is being transmitted at the instant the "breakover relay 3" operates, the condenser C$_2$ will be made more negative with respect to the grid of tube VT$_2$ and the plate current will be decreased. On the other hand, if the outgoing polarity is positive, the condenser C$_2$ would have its charge altered accordingly so that the plate current would be increased. Normally these changes in grid voltage are quite small by using a resistance R$_3$ of very high value.

The purpose of the neon lamp N through which the condenser receives its current, is to block the discharge of condenser C$_2$ and permit the condenser to retain its state of charge except for the correcting impulses. It is apparent, therefore, that the plate current of VT$_2$ is caused to increase or decrease by small increments, depending upon whether the duplex balancing resistance is too large or too small.

The plate current of tube VT$_2$ passes through the winding of solenoid magnet 6 and causes its core or armature to apply force to a pressure type (carbon pile) rheostat 7 which is made a part of the artificial line of the duplex system. During normal operation of the duplex circuit, the plate current of VT$_2$ is always seeking a value which will establish the proper balance as long as the resistance of the main line remains constant, the variation of this plate current which controls the rheostat is quite small on account of the frequent corrections and the small increments of change employed. When the line resistance changes, the plate current of VT$_2$ changes accordingly, until a state of equilibrium is established.

I have shown the breakover relay 3 provided with a holding magnet $c$ which receives an impulse through the condenser C$_3$ and resistance R$_4$ each time the transmitter T is operated. This is for the purpose of preventing any imperfections in the capacity balance from influencing the balance-correcting apparatus. This holding force is of sufficient strength and duration to render the relay 3 inoperative during any line transient caused by such capacity unbalance. A single current relay 8 receives impulses from the transmitter through resistance R$_5$ and condenser C$_4$ which keeps its armature pulled against its front stop while the transmitter is operating on the slowest telegraph signals. If the operation of the transmitter stops, the tongue of relay 8 moves to its back contact and prevents the tube VT$_2$ from receiving correcting impulses.

In the arrangement just described, the peak of the received signal is detected and its moment of occurrence is taken with respect to the simultaneously transmitted polarity to give the indication of the state of the duplex balance. In the embodiments of my invention, which I shall now describe, the maximum amplitude of the received signals are measured and recorded under the two conditions, i. e., while the polarities of the incoming and outgoing signals are alike and second, while the polarities of the incoming and outgoing signals are unlike. A comparison of these two measurements, that is the differences in the two values, gives us a measure of the kind and the degree of any resistance unbalance.

Figure 3:
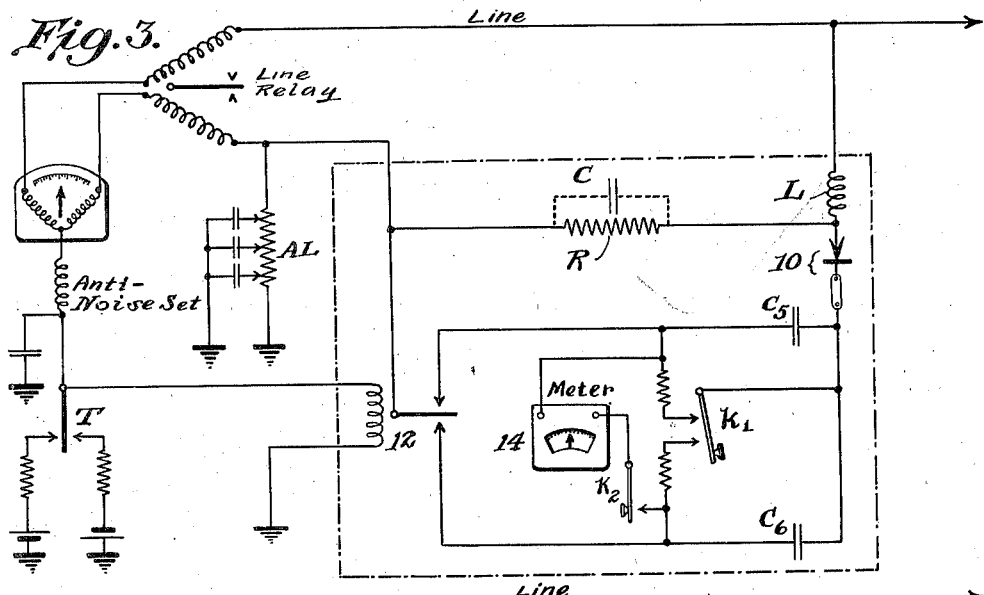
Figure 3 illustrates diagrammatically an arrangement according to my invention for measuring the maximum amplitude of the received signals under the two conditions, when the polarities of the incoming and outgoing signals are alike and when they are unlike and comparing the difference in the two values to indicate the kind and degree of unbalance.

One arrangement for determining this resistance unbalance is shown in Fig. 3. The received signals to be measured are impressed across the resistance R. An inductance L is included to give the bridge circuit the proper time constant to conform to that of the line relay which it shunts. A condenser C may be shunted across resistance R to form a filter in conjunction with inductance L which will suppress any high frequency extraneous currents existing in the line.

The rectifier 10 in conjunction with the condensers $C_5$ and $C_6$ constitute two peak voltage measuring devices. The switching relay 12, connected in a leak circuit controlled by the transmitter T, connects one of these peak measuring devices across resistance R while the received polarity and the transmitted polarity are alike and connects the other device across resistance R while the polarities are unlike. By closing the keys $k_1$ and $k_2$ the resistance unbalance in the artificial line is indicated by the voltmeter 14 both as to degree and as to kind, i. e., whether too great or too little.

Figure 4:
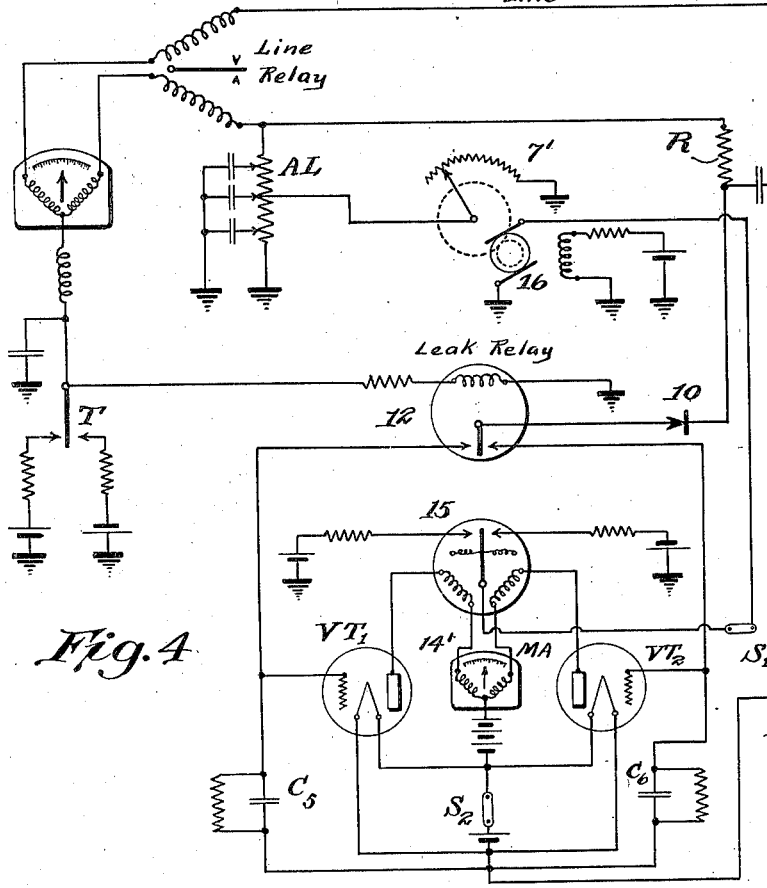

The unbalance indicator just described may be arranged to control a motor controlled rheostat for automatically adjusting the artificial line resistance in the manner indicated in Fig. 4. A self-centering differential polar relay 15 is inserted in circuit with the resistance unbalance indicating meter 14' to control the movements of the electric motor 16 which shifts the arm of the rheostat 7' to increase or decrease the resistance in the artificial line AL.

As the tongue of the leak relay 12 engages one contact or the other, depending upon the like or unlike polarities between the received and transmitted impulses, the condenser $C_5$ or $C_6$ is connected in the bridge circuit across the line relay. The condenser charges control the variations in plate currents of the tubes $VT_1$ and $VT_2$ which are in circuit with the respective coils of the differential milliammeter 14' and the self-centering polar relay 15. Accordingly, inequalities in the condenser charges cause the relay 15 to close one or the other of its contacts, depending upon whether the artificial line resistance should be increased or decreased for proper balance. The relay contacts apply voltage to the armature of the motor 16 to cause rotation of the rheostat arm in the direction required to improve the resistance balance. Switches $S_1$ and $S_2$ may be left closed continuously, in which case the rheostat would be driven at a very slow rate. They may be closed periodically by hand or by a one minute time service, for example, thereby setting the rheostat by small steps periodically as long as the self-centering polar relay 15 receives indications of unbalance. The high resistances across the condensers may be left on at all times, giving the condensers a sufficient rate of discharge to allow automatic adjustment to lower signal levels, or they may also be switched on periodically.

The two signal levels (indicated at $a$ and $b$ in Figs. 1—c and 1—d) may be measured independently by two similar "break-over relays" arranged as shown in Fig. 5. These relays 3A and 3B are shown as polar relays, although the single current type shown in Fig. 2 may be used for this purpose. Currents from local batteries through resistances $R_a$ and $R_b$ supply current to the relay biasing coils $b$ of somewhat more than sufficient strength to hold the tongues on their "spacing" contacts $s$, despite the largest value of received "marking" signals.

The plate currents of vacuum tubes $VT_a$ and $VT_b$ set up magnetizing forces in the respective relays which oppose the steady bias of the coils $b$. That is, the plate currents are in a "marking" direction. Starting with sufficient plate currents, therefore, the incoming or received "marking" signals will overpower the net spacing force and operate the relay tongues to their marking contacts $m$. The operation of the leak relay 12, locks the relay 3A during the transmission of one polarity and the 3B relay during the transmission of the other polarity, by alternately short-circuiting a large portion of the resistances $R_a$ and $R_b$ in series with the respective biasing coils $b$. Therefore, these relays operate selectively according to the polarity of the transmitted signal. Each time a relay operates to its marking contact $m$, a negative potential is applied to the grid condenser $C_a$ or $C_b$ of the respective tube and this decreases the value of the plate current by a small amount, thus leaving the relay with an increase in spacing bias. These operations continue until the spacing bias is built up in each relay to exceed the maximum value of the received marking signal. Any difference in the plate currents will indicate the difference between the two signal levels which determines the state of duplex balance. The difference in plate currents is indicated by the milliammeter 14'.

As in the arrangement of Fig. 4 previously described, a differential self-centering polar relay 15, controls the polarity of the currents supplied to the armature of the motor 16 and thus the direction of movement of the rheostat arm 7' either directly or through a periodically closed switch $k$. The relay 17 connected to the leak circuit from the transmitter, is for the purpose of locking the relays 3A and 3B on their spacing contacts during idle periods of the transmitter. In this arrangement I depend upon the armature travel time of the leak relay 12 to render the "breakover relays" 3A and 3B immune to transients caused by capacity unbalance.

I have illustrated and described several arrangements for measuring and automatically correcting duplex unbalance in order that my invention may be clearly understood but it will be evident to engineers that other modifications and arrangements may be made within the purview of this invention and within the scope of my claims.

I claim:

1. The method of automatically correcting any unbalance between the resistances of the real and artificial lines in a duplex telegraph line, which consists in selecting the maximum amplitude of the received signal waves when the incoming and outgoing impulses are of like polarity and likewise when the impulses are of unlike polarity and varying the resistance of the artificial line under the control of the resultant effect between said different conditions.

2. In a duplex telegraph system, transmitting and receiving apparatus, and means for balancing the resistance of the real and artificial lines, comprising a relay connected in a leak circuit to said transmitting apparatus, a pair of condensers arranged to be selectively connected in a bridge circuit across said receiving apparatus by said leak circuit relay during the transmitting periods, a pair of thermionic tubes controlled by the respective charges on said condensers, a polar relay having its windings in the plate circuits of said tubes respectively, and a motor driven rheostat connected to the artificial line and controlled by the operation of said polar relay.

3. In a duplex telegraph system as set forth in claim 2, an instrument in circuit with the windings of said polar relay operating to indicate the relative magnitude and the character of the unbalance between the real and artificial lines.

4. In a duplex telegraph system, transmitting and receiving apparatus, and means for balancing the resistance of the real and artificial lines, comprising a polar relay connected in a leak circuit to the transmitting apparatus, a pair of "breakover" polar relays each having a winding in a bridge circuit across said lines, a biasing winding tending to bias the relay to its spacing contacts, and an assisting winding opposing the biasing winding, a relay connected in a leak circuit to the transmitting apparatus operating to reduce the resistance in the biasing windings and thereby lock the breakover relays selectively in accordance with the polarity of the transmitted impulses, a pair of thermionic tubes having their plate circuits connected respectively to said assisting windings and their grid circuits connected to the marking contacts of said tubes, a condenser in shunt to each grid, a self-centering polar relay having its windings connected respectively in circuit with said assisting windings, and a motor-driven rheostat adapted to vary the resistance of the artificial line and actuated under the control of said last named relay.

5. In a duplex telegraph system, transmitting and receiving apparatus, and means for balancing the resistance of the real and artificial lines, comprising a polar relay connected in a leak circuit to the transmitting apparatus, a pair of "breakover" relays bridged across said lines and arranged to operate respectively upon the peak of the received signal waves when the incoming and outgoing impulses are of like polarity and when the impulses are of unlike polarity, a relay connected in a leak circuit to the transmitting apparatus operating to lock said "breakover" relays selectively in accordance with the transmited impulses, a self-centering polar relay controlled by the operation of said breakover relays, and a motor-driven rheostat operating to vary the resistance of the artificial line and controlled by said polar relay.

RALEIGH J. WISE.